J. J. SANDGREN.
Shearing, Punching and Upsetting Iron.
No. 70,366.  
Patented Oct. 29, 1867.
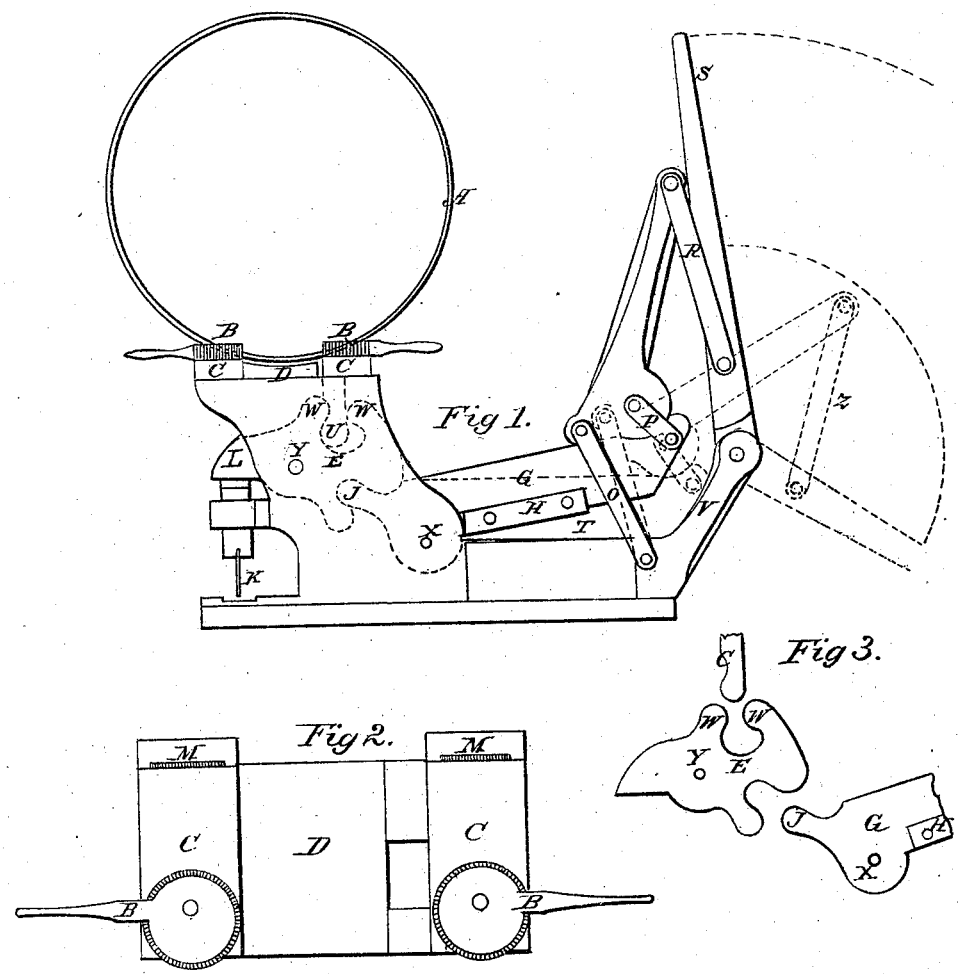

United States Patent Office.

JOHN J. SANDGREN, OF LYONS CITY, IOWA.

Letters Patent No. 70,366, dated October 29, 1867.

---

IMPROVED COMPOUND TOOL FOR SHEARING, PUNCHING, AND UPSETTING.

---

The Schedule referred to in these Letters Patent and making part of the same.

---

TO ALL WHOM IT MAY CONCERN:

Be it known that I, JOHN J. SANDGREN, of the city of Lyons, in Clinton county, State of Iowa, have invented a new and useful machine, which I call a Combined Shears, Tire-Shrinker, and Punch.

The object of my invention is to have a machine that can easily be worked in any place to cut off iron, shrink tire, or punch holes.

Now it is very desirable to cut iron off cold; also to punch holes in it when cold; and instead of cutting the tire and welding, I can heat it, and by placing it in the clamps and moving the lever, shrink it in a few moments, thereby saving time and labor.

In order to enable others to make and use my invention, I will carefully describe its construction and operation, reference being had to the annexed drawings, and letters of reference marked thereon, making a part of this specification, in which drawings—

Figure 1 is a side elevation and longitudinal section. The dotted lines at E indicate the position of the parts as seen in longitudinal section when the lever S is thrown up to open the machine. The dotted lines at Z indicate the position of the levers when the machine is closed.

Figure 2 is a top view of the clamp for shrinking tire.

Figure 3 shows the parts detached for operating the punch and tire-shrinker.

The same letters refer to same parts in the several figures.

A indicates the tire in position to be clamped. B B indicate the clamp-cams. C C indicate the clamp-heads. D indicates the anvil or bed of clamp. E indicates the toggle-headed lever to operate punch and tire-shrinker. G indicates the moving jaw of the shears. H indicates the cutting edge, to be of steel. J indicates the toggle-head on lever G, to operate lever E. K indicates the punch. L indicates the attachment of punch to lever E. M M indicate the jaw or stop to hold tire. O indicates the strap or link attaching levers. P indicates the strap or link attaching levers. R indicates the strap or link attaching levers. S indicates the operating lever. T indicates the stationary jaw of shears. W W indicate the shape of the parts that move the head of the tire-shrinker. X indicates the pin or point the jaw G works on. Y indicates the pin or point the toggle-lever E works on. Z indicates the position of the straps and levers when the jaws are closed.

Now, in constructing my machine, I make it of any suitable material, usually of cast iron, save the straps, pins, and lever S. The combination of levers to operate the machine is the same as is secured to me by Letters Patent dated April 16, 1867. I have improved upon the position of the attachment of the stationary end by extending the arm of the stationary jaw marked V. I construct the lever E of suitable material and shape to be operated on by toggle J.

The operation of my machine is as follows: In order to shrink tire, first heat the tire to a proper temperature for upsetting, then place the tire as indicated in fig. 1, the place heated between the heads, and clamp it firmly by turning the cams B B, so as to force the teeth firmly against the tire, and also against the jaw M. Now it will be seen that the position of these cams B B is such that, as the heads C C are brought together, the clamps or cams are forced still more firmly against the tire there by forcing it together and shortening or shrinking it, and you have but to properly hammer it on the bed D to finish it. And to punch holes the iron is placed on the bed at K, and the lever S brought down. This operates the toggle J, which moves the lever E on its pivot Y, causing the point at L to move down, the punch-socket being properly attached to it by a socket and pin, and by this movement the punch is forced through the iron.

The arrangement for cutting off iron having been already secured by patent, I will not describe its operation, and, in this, claim no patent therefor.

What I claim as my invention, and desire to secure by Letters Patent, is—

The combination and arrangement of the levers G and E with the toggles W W, J, and U, when constructed, arranged, and operating substantially as and for the purposes as above set forth.

JOHN J. SANDGREN.

Witnesses:
WM. W. SANBORN,
JNO. W. McLEOD.